(12) United States Patent (10) Patent No.: US 9,292,557 B2
Benari (45) Date of Patent: Mar. 22, 2016

(54) MANAGING VIRTUAL MACHINES USING HIERARCHICAL LABELING

(75) Inventor: Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 591 days.

(21) Appl. No.: 12/395,413

(22) Filed: Feb. 27, 2009

(65) Prior Publication Data

US 2010/0223309 A1    Sep. 2, 2010

(51) Int. Cl.
*G06F 17/30* (2006.01)
*G06F 7/00* (2006.01)

(52) U.S. Cl.
CPC .................. *G06F 17/30327* (2013.01)

(58) Field of Classification Search
CPC ...................................................... G06F 17/00
See application file for complete search history.

(56) References Cited

U.S. PATENT DOCUMENTS

| | | | | |
|---|---|---|---|---|
| 4,253,145 | A * | 2/1981 | Goldberg | 703/21 |
| 4,949,254 | A * | 8/1990 | Shorter | 718/106 |
| 5,898,836 | A | 4/1999 | Freivald et al. | |
| 5,913,065 | A * | 6/1999 | Faustini | 717/107 |
| 6,009,271 | A | 12/1999 | Whatley | |
| 6,728,746 | B1 * | 4/2004 | Murase et al. | 718/1 |
| 6,766,315 | B1 | 7/2004 | Bratsos et al. | |
| 7,020,750 | B2 | 3/2006 | Thiyagaranjan et al. | |
| 7,117,241 | B2 * | 10/2006 | Bloch et al. | 709/201 |
| 7,401,064 | B1 * | 7/2008 | Arone et al. | |
| 7,409,379 | B1 | 8/2008 | Katzer | |
| 2002/0073063 | A1 * | 6/2002 | Faraj | 707/1 |
| 2002/0107835 | A1 | 8/2002 | Coram et al. | |
| 2004/0046787 | A1 | 3/2004 | Henry et al. | |
| 2004/0267900 | A1 | 12/2004 | Hoekstra et al. | |
| 2005/0102297 | A1 * | 5/2005 | Lloyd et al. | 707/100 |
| 2005/0216421 | A1 | 9/2005 | Barry et al. | |
| 2006/0059253 | A1 | 3/2006 | Goodman et al. | |
| 2007/0088762 | A1 * | 4/2007 | Harris et al. | 707/201 |
| 2007/0179955 | A1 * | 8/2007 | Croft et al. | 707/9 |
| 2007/0300220 | A1 * | 12/2007 | Seliger et al. | 718/1 |
| 2008/0016056 | A1 | 1/2008 | Malloy et al. | |
| 2008/0086464 | A1 * | 4/2008 | Enga | 707/4 |
| 2008/0098309 | A1 * | 4/2008 | Fries | G06F 9/4443 715/734 |
| 2008/0270354 | A1 * | 10/2008 | Weissman | 707/2 |
| 2009/0013321 | A1 * | 1/2009 | Mattiocco et al. | 718/1 |
| 2009/0094200 | A1 | 4/2009 | Baeza-Yates et al. | |
| 2009/0210427 | A1 | 8/2009 | Eidler et al. | |
| 2010/0332489 | A1 | 12/2010 | Benari et al. | |

OTHER PUBLICATIONS

VMware; VMware Infrastructure Architecture Overview; 2006; pp. 1-13.*
Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.

(Continued)

*Primary Examiner* — Jeffrey A Burke
(74) *Attorney, Agent, or Firm* — Lowenstein Sandler LLP

(57) ABSTRACT

A host controller maintains a hierarchy of labels representing distinct virtual machine parameters, allows a user to specify labels for virtual machines hosted by one or more servers coupled to the host controller, and stores the specified labels in association with respective virtual machines in a database that reflects relationships between the labels according to the hierarchy. The host controller then facilitates management of the virtual machines using the labels.

13 Claims, 6 Drawing Sheets

(56) References Cited

OTHER PUBLICATIONS

Qumranet, Solid ICE™, Provisioning Manager, Apr. 2008, 5 pages.
Qumranet, Solid ICE™, Virtual Desktop Server (VDS), Apr. 2008, 6 pages.
The TimesTen Team, "Mid-Tier Caching: The TimesTen Approach" Jun. 4-6, 2002, ACM SIGMOD, p. 588-593.
Red Hat Israel Non-Final Office Action for U.S. Appl. No. 12/490,710, mailed Jul. 12, 2011.
USPTO, Final Office Action for U.S. Appl. No. 12/490,710 mailed on Dec. 29, 2011.
USPTO, Office Action for U.S. Appl. No. 12/490,710 mailed Dec. 26, 2013.
USPTO, Office Action for U.S. Appl. No. 12/490,710 mailed Aug. 26, 2014.

* cited by examiner

MANAGING VIRTUAL MACHINES USING HIERARCHICAL LABELING

TECHNICAL FIELD

Embodiments of the present invention relate to virtual machines, and more specifically, to the management of virtual machines by means of hierarchical labeling.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

Virtual machines can be provided by a centralized host that is coupled to multiple clients over a network. Each client can provide a virtual desktop environment indistinguishable from a physical desktop. A large organization with many different departments and multiple offices at various locations may have a system with thousands of virtual machines. Management of numerous virtual machines is a complex task that requires a large degree of system scalability.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
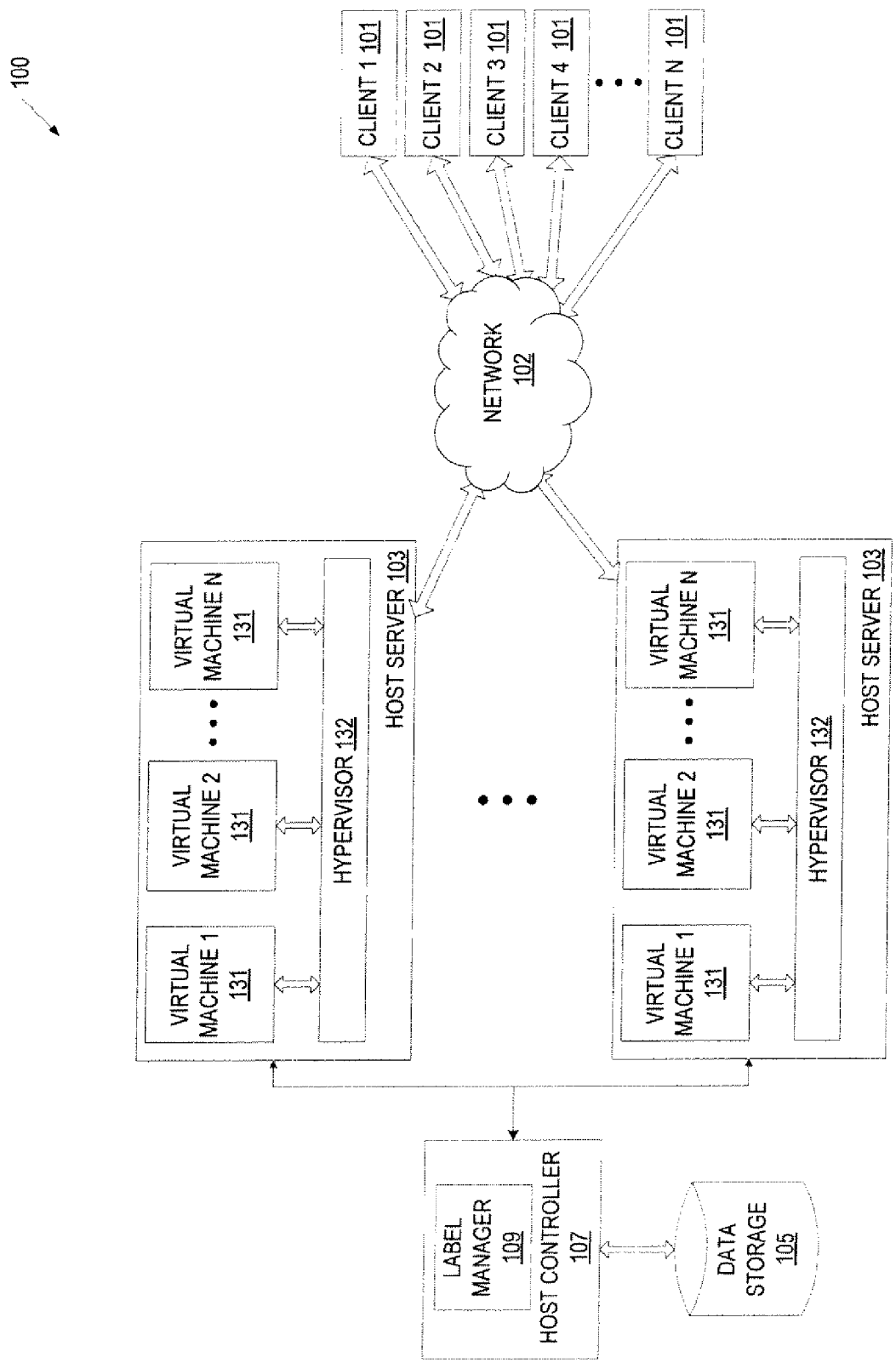
FIG. 1 illustrates an exemplary network architecture in which embodiments of the present invention may operate.

Described herein is a method and system for managing virtual machines by means of hierarchical labeling. In one embodiment, servers hosting virtual machines are coupled to a host controller that maintains a hierarchy of labels representing distinct virtual machine parameters. Virtual machine parameters may include, for example, a geographic location of a virtual machine, a department of a virtual machine user, a technical characteristic of a virtual machine, etc. The host controller allows a user such as a system administrator to specify parameters of the virtual machines via labels, and stores the labels in association with respective virtual machines in a database that reflects relationships between the labels according to the hierarchy. The host controller then facilitates management of the virtual machines using the labels. In particular, the host controller can determine parameters of a specific virtual machine, identify virtual machines that have one or more parameters in common, and/or obtain any other information pertaining to the virtual machines using hierarchical labeling.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing", "transferring", "identifying", "hashing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via a network or directly). Host controller 107 may be an independent machine such as a server computer, a desktop computer, etc. Alternatively, the host controller 107 may be part of the host server 103.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop.

The virtual machines 131 are managed by the host controller 107. The host controller 107 may add a virtual machine, delete a virtual machine, provide upgrades for specific virtual machines, balance the load on the host servers 103, provide directory service to the virtual machines 131, and perform other management functions. Typically, the host controller 107 performs a management function responsive to a request of a user such as a system administrator. With a large number of virtual machines 131, a system administrator may need to know various parameters of the virtual machines 131 to be able to organize the virtual machines 131 in various ways, request operations concerning specific virtual machines, etc.

In one embodiment, the host controller 107 provides a hierarchical labeling mechanism that associates a virtual machine 131 with one or more labels representing distinct virtual machine parameters. For example, a virtual machine 131 may be associated with labels representing the geographic location of the virtual machine 131 such as a region label (e.g., Europe), a country label (e.g., France) and a city label (e.g., Paris). In addition, the virtual machine 131 may be associated with labels representing a positioning of a user of the virtual machine 131 within the organization (e.g., a department label, a group label, and a title label). The virtual machine 131 may also be associated with labels representing technical characteristics of a virtual machine (e.g., a memory allocation label, an operating system label, etc.), or with any other labels.

In one embodiment, the host controller 107 includes a label manager 109 that associates virtual machines 131 with respective labels and stores this information in a database residing on a data storage device 105. The data storage device may share the machine with the host controller 107 (e.g., a disk drive in the host controller computer) or be an independent device coupled to the host controller directly or via a network (e.g., as a network-attached storage device (NAS)). The label manager 109 also defines hierarchical relationships between labels and stores this information in the database. The label manager 109 can then use data from the database to determine parameters of a specific virtual machine, identify virtual machines that have one or more parameters in common, and/or obtain any other information pertaining to the virtual machines 131.

Figure 2:
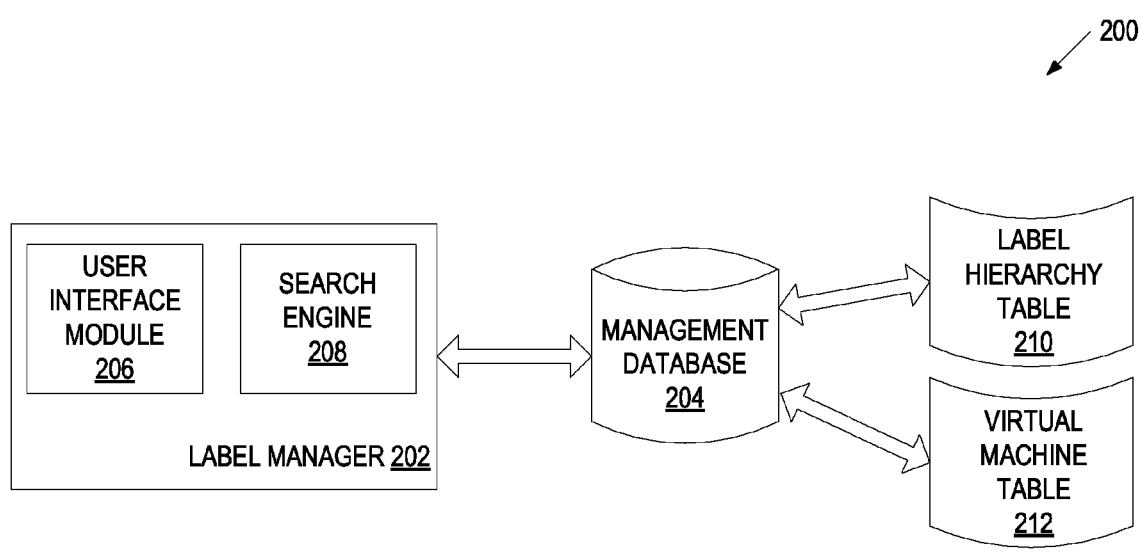
FIG. 2 is a block diagram of an embodiment of a host controller.

FIG. 2 is a block diagram illustrating a hierarchical labeling system 200 in accordance with one embodiment of the present invention. The system 200 includes a label manager 202, which may be similar to label manager 109, and a management database 204, which may be hosted by data storage device 105.

The label manager 202 may include a user interface module 206 that provides a user interface allowing a system administrator to define labels and to specify hierarchical relationships between the labels. Each label may be an object having an identifier. For example, each label may be an object in the form of a file (e.g., a text file, a XML file, etc.). The labeling hierarchy can be represented as a tree, and the relationships between the labels within the tree can be defined in the management database 204 (e.g., a label hierarchy table 210) using respective label identifiers.

The user interface module 206 may also provide a user interface allowing a system administrator to assign various labels to the virtual machines. Labels may be assigned when a new virtual machine is added to a host server. Subsequently, labels of a virtual machine can be modified (e.g., in response to a system administrator's request). Label assignment information is stored in the management database (e.g., in a virtual machine table 212). For example, the virtual machine table 212 may store identifiers of virtual machines with identifiers of respective labels.

The user interface module 206 may further provide a user interface allowing a system administrator to request information pertaining to virtual machine parameters. For example, the system administrator may need to know parameters of a specific virtual machine, or virtual machines that have one or more parameters in common. Upon receiving a system administrator request, the search engine 208 searches the management database 204 (e.g., using an SQL query) and retrieves the requested information. The user interface module 206 then presents the resulting information to the system administrator in a user interface.

Figure 3:
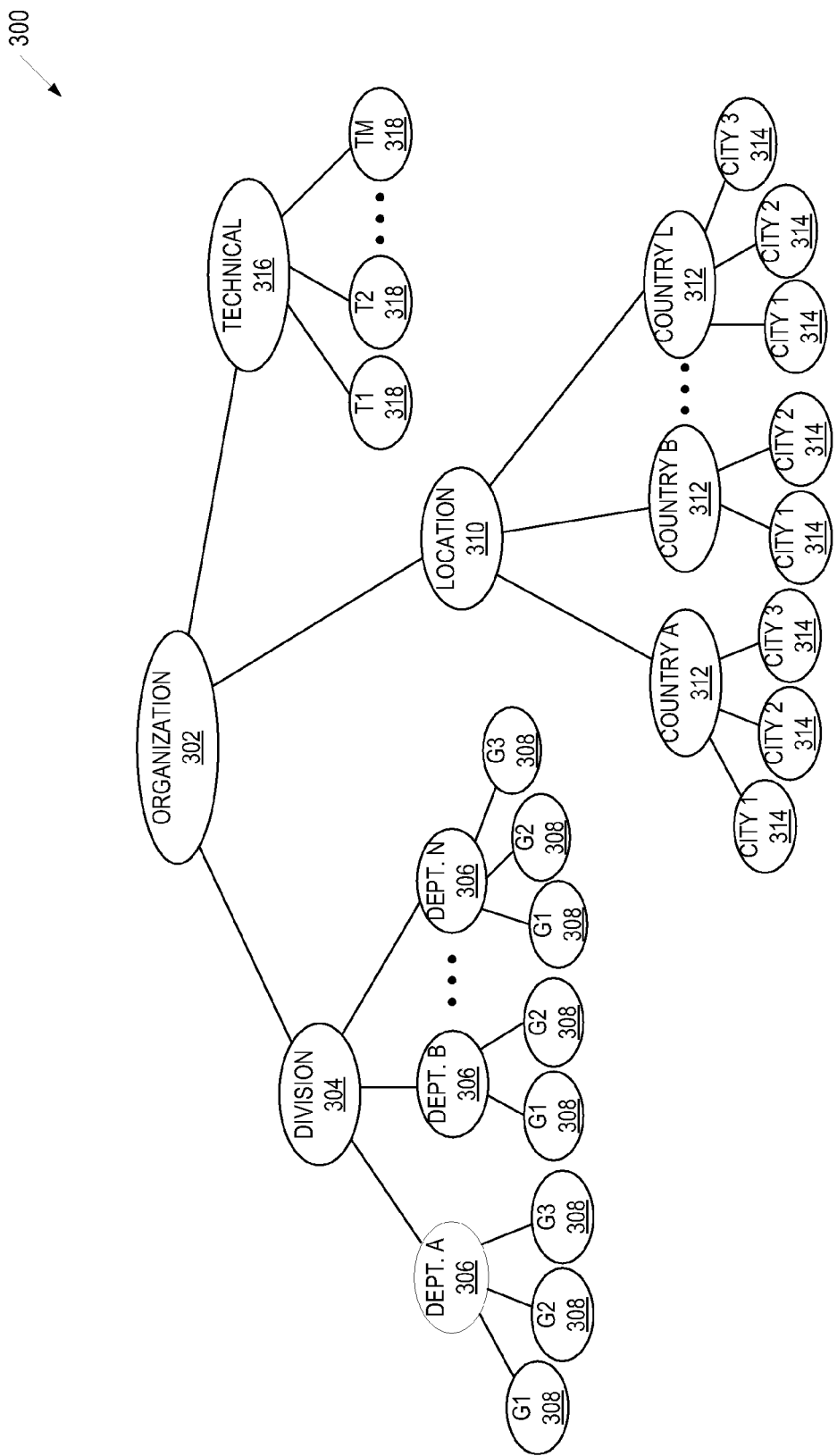
FIG. 3 illustrates an exemplary labeling hierarchy, in accordance with one embodiment of the present invention.

FIG. 3 illustrates an exemplary labeling hierarchy 300 in accordance with one embodiment of the present invention. The hierarchy 300 has a form of a tree, with nodes representing labels and edges representing relationships between the labels. In particular, node 302 represents an organization label (e.g., a company, a university, a library, etc.). Node 304, which is a child of node 302, corresponds to a label representing a division within the organization (e.g., Sony Ericsson, Sony Pictures Entertainment, etc.). Nodes 306, which are the children of node 304, represent departments of virtual machine users within the division, and nodes 308, which are the children of respective nodes 306, represent groups of virtual machine users within the department.

Another child of node 302 is node 310 representing a virtual machine location (e.g., Europe, Middle East, North America, etc.). Nodes 312, which are the children of node 310, represent countries, and nodes 314, which are the children of node 312, represent cities.

Node 316, which is also a child of node 302, represents technical characteristic type label (e.g., hardware, operating system, applications, etc.). Nodes 318, which are the children of node 316, represent specific technical characteristics of a virtual machine (e.g., a memory allocation parameter, a graphics parameter, etc.).

As shown in FIG. 3, the labeling hierarchy 300 provides an easy and convenient way of tagging virtual machines with a wide variety of labels and defining relationships between these labels.

Figure 4:
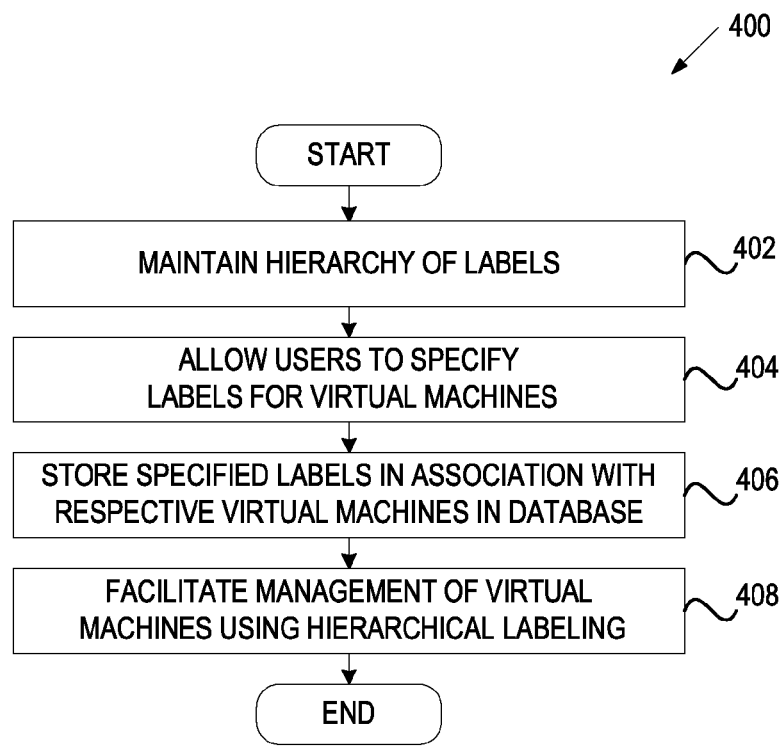
FIG. 4 is a flow diagram of one embodiment of a method for facilitating management of virtual machines using hierarchical labeling.

FIG. 4 is a flow diagram illustrating one embodiment of a method 400 for facilitating management of virtual machines using hierarchical labeling. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a host controller (e.g., host controller 107 of FIG. 1).

Referring to FIG. 4, method 400 begins with maintaining a hierarchy of labels (block 402). As discussed above, labels represent various virtual machine parameters and may be stored as objects (e.g., in the form of files) having unique identifiers. The labeling hierarchy may be in the form of a tree, with nodes representing labels and edges representing relationships between the labels. Information identifying labels and their relationships is stored in a database.

At block 404, processing logic allows a user such as a system administrator to specify labels for a virtual machine. Alternatively, processing logic may associate a label with a virtual machine automatically upon detecting a certain event (e.g., when a user of a virtual machine moves to a new department within a company). At block 406, processing logic stores the labels in association with respective virtual machines in a database.

At block 408, processing logic facilitates management of virtual machines using hierarchical labeling. In particular, processing logic facilitates grouping of virtual machines based on relevant labels, provides information pertaining to virtual machines in the context of relevant labels, and triggers other operations to be performed with respect to virtual machines based on relevant labels.

Figure 5:
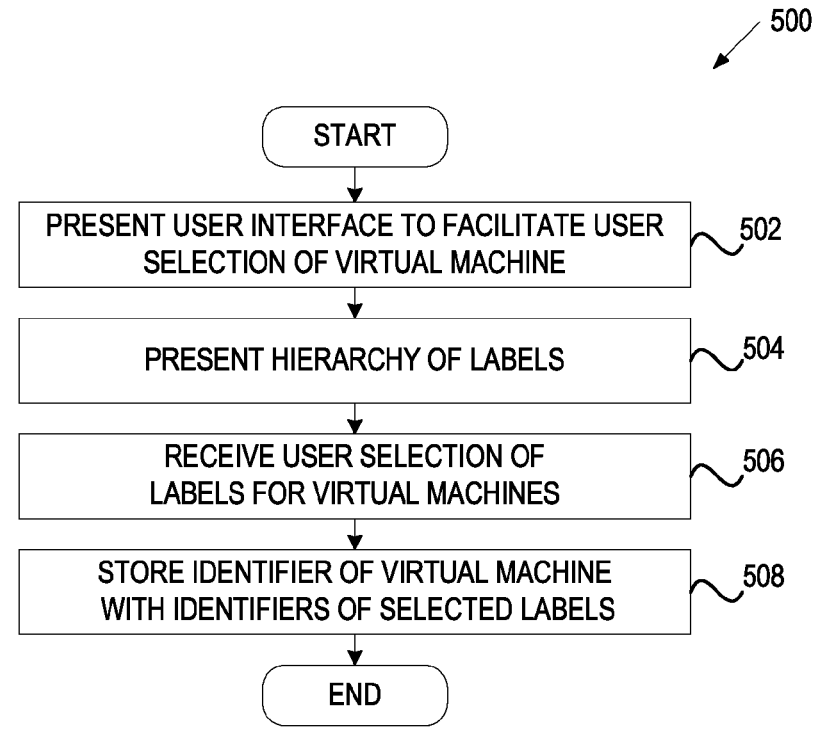
FIG. 5 is a flow diagram of one embodiment of a method for assigning labels to a virtual machine.

FIG. 5 is a flow diagram illustrating one embodiment of a method 500 for assigning labels to a virtual machine. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a host controller (e.g., host controller 107 of FIG. 1).

Referring to FIG. 5, method 500 begins with presenting a user interface that displays a list of virtual machines and allows a user to select a specific virtual machine (block 502). The selected virtual machine may be an existing virtual machine that has previously assigned labels or the selected virtual machine may be a new virtual machine that is being added to a host server and does not have any assigned labels yet.

At block 504, processing logic displays a hierarchy of labels in a user interface. The hierarchy can be displayed as a tree, with nodes representing labels and edges representing relationships between the labels. Alternatively, the hierarchy can be displayed in a different form (e.g., as a table listing labels and their respective parents and children).

At block 506, processing logic receives a user selection of labels for the virtual machine specified at block 502. The user selection of labels can be received via the user interface presented at block 504.

At block 508, processing logic stores the identifier of the above virtual machine with the identifiers of the selected labels in a database. Subsequently, the user can request to view the existing labels of the virtual machine and can submit a request to modify or add new labels for the virtual machine. Processing logic then records the requested changes in the database.

Figure 6:
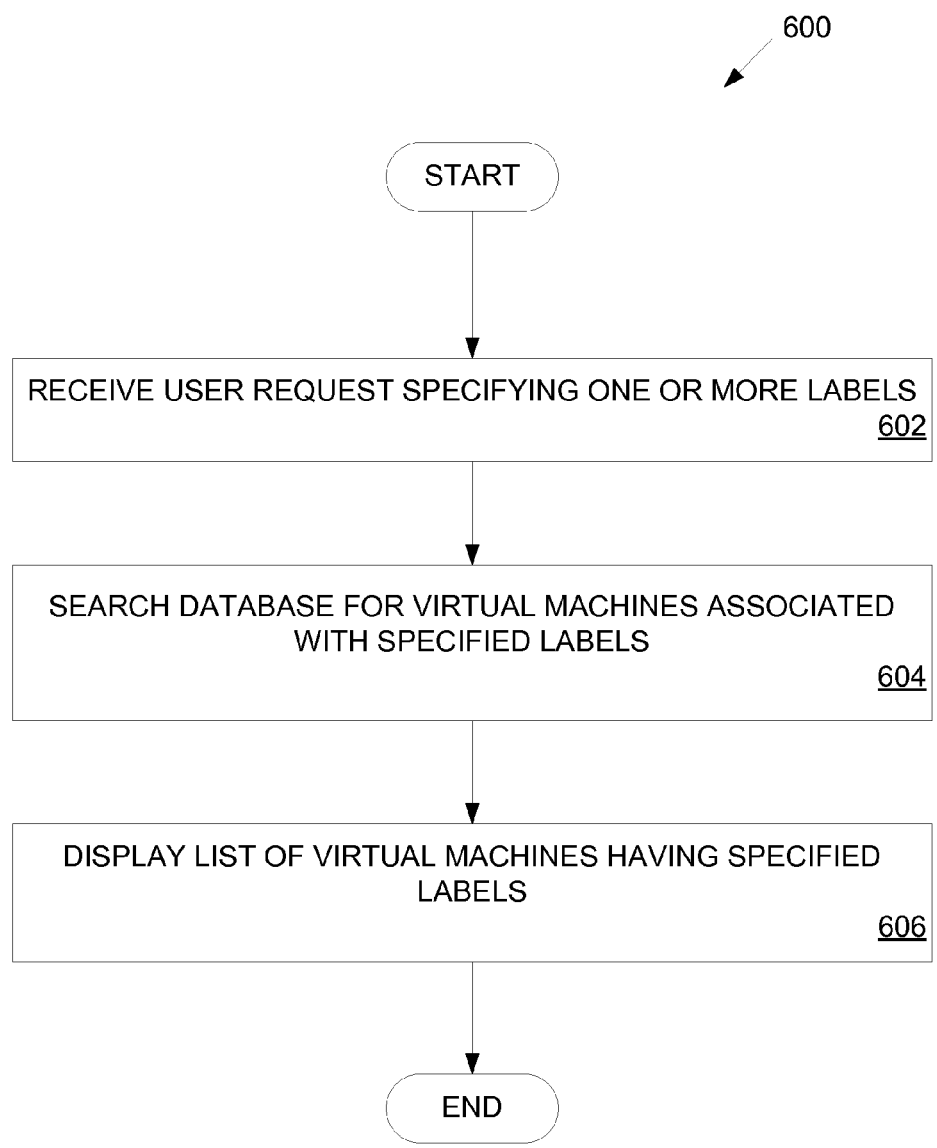
FIG. 6 is a flow diagram of one embodiment of a method for finding virtual machines with similar characteristics based on labels.

FIG. 6 is a flow diagram of one embodiment of a method for finding virtual machines with similar characteristics based on labels. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by a host controller (e.g., host controller 107 of FIG. 1).

Referring to FIG. 6, method 600 begins with receiving a request of a system administrator to identify virtual machines having one or more specified labels (block 602). At block 604, processing logic searches the database for virtual machines associated with the specified labels. At block 606, processing logic displays a list of virtual machines having the specified labels. The above search request can be translated into an SQL query, saved as a bookmark and repeated as needed.

Similarly, a system administrator can be provided with a list of labels of a specific virtual machine or with any other information pertaining to the virtual machines using hierarchical labeling. In addition, a system administrator can request that a certain operation be performed with respect to virtual machines having specified labels. Depending on the request, the desired operation can be performed periodically or only once.

Figure 7:
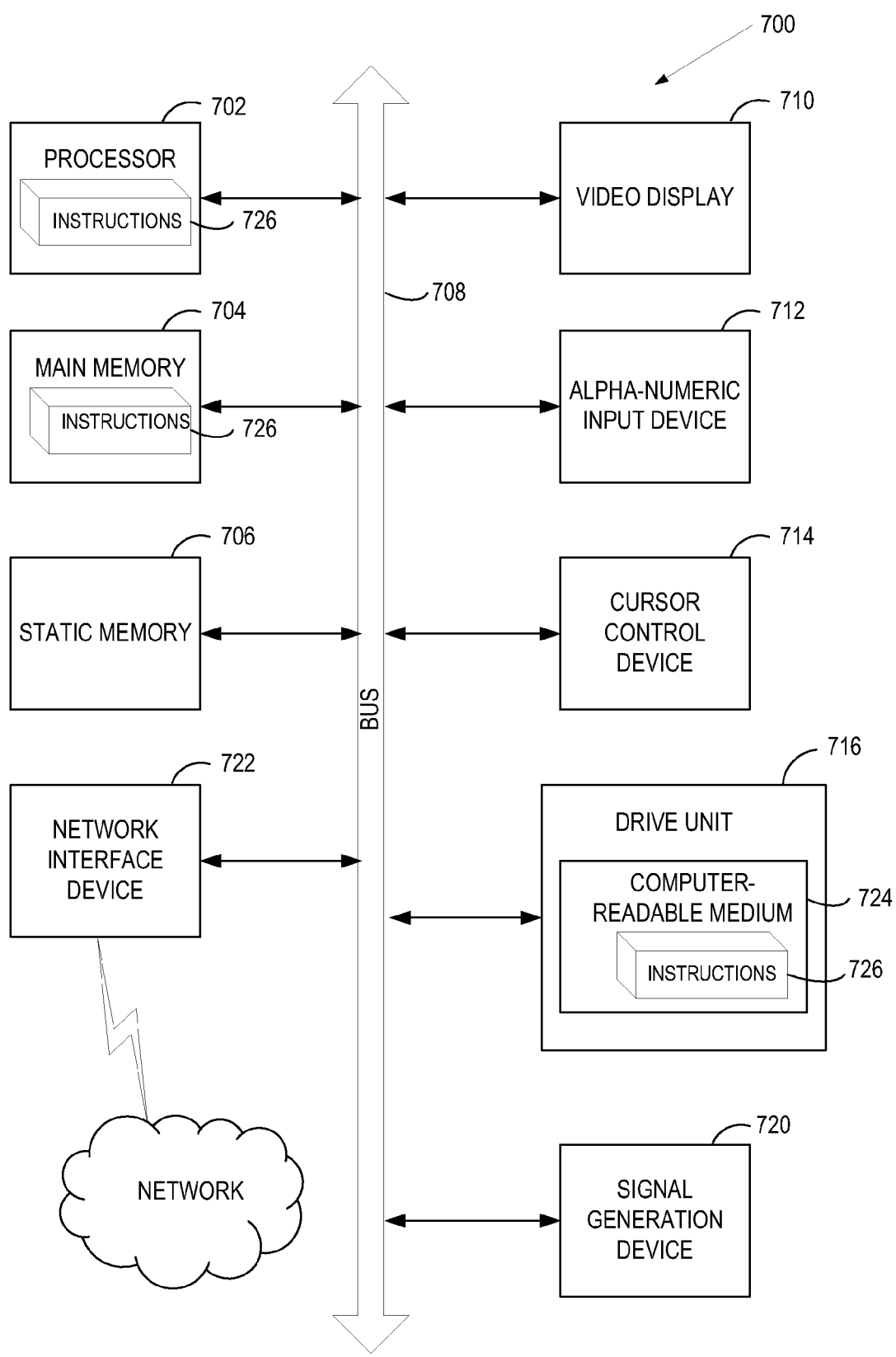
FIG. 7 illustrates a diagrammatic representation of a machine in the exemplary form of a computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory 718 (e.g., a data storage device), which communicate with each other via a bus 730.

The processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may also be used to store the label manager 109 of FIG. 1. While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

maintaining, by a processor executing a host controller, a hierarchy of labels in a management data store, each of the labels of the hierarchy of labels representing a distinct virtual machine (VM) parameter that describes a characteristic of a VM and is separate from a unique identifier (ID) of the VM, wherein the management data store maintaining the hierarchy of labels is separate from VMs associated with the labels;

detecting, by the processor, without user interaction, an event that triggers a label reassignment for a VM of a plurality of VMs hosted by one or more servers coupled to the host controller;

identifying, by the processor in response to detecting the event, one or more labels of the hierarchy of labels that correspond to the event and the VM for the label reassignment, the identifying comprising:

providing a user interface presenting the hierarchy of labels;

receiving a selection of a set of labels for the VM from the hierarchy of labels; and assigning, in response to the selection, the set of labels from the hierarchy of labels to the VM;

storing, by the processor in response to identifying the one or more labels, identifiers of the identified labels with the unique ID of the VM in a VM data store, the storing further comprising:

storing, in a first database table of the management store, the identifiers of the identified labels from the hierarchy, descriptions of the identified labels, and relationships between the identified labels, wherein the first database table comprises the hierarchy of labels and is a tree having a plurality of nodes representing the labels and a plurality of edges representing relationships between the labels; and storing, in a second database table of the management store, the unique ID of the VM along with the identifiers of the identified labels corresponding to the VM by at least one of modifying previously-assigned labels of the VM or adding new labels to the VM;

grouping, by the processor in response to the label reassignment for the VM, and in view of the relationships between the identified labels, the VM with other VMs associated with the identified labels; and performing, by the processor in view of the grouping, a management operation on the VM and the other VMs in response to receiving an end user selection of the identified labels and an identification of the management operation via a graphical user interface (GUI).

2. The method of claim 1, wherein the distinct VM parameter is any one of an organization division characteristic, a geographic location characteristic, and a technical characteristic.

3. The method of claim 1, wherein the grouping the VM with the other VMs further comprises:
receiving a user request for a list of VMs having one or more specified labels;
searching the VM data store based on the specified labels; and
displaying a list of VMs having the specified labels.

4. The method of claim 3, further comprising:
displaying relationships between the specified labels.

5. The method of claim 1, wherein the grouping the VM with the other VMs further comprises:
receiving a user request for a list of labels associated with the VM;
searching the VM data store based on the VM; and
displaying the list of labels associated with the VM.

6. A system comprising:
a data storage device comprising a data store to store a hierarchy of labels in a management database, each of the labels of the hierarchy of labels representing a distinct virtual machine (VM) parameter that describes a characteristic of a VM and is separate from a unique identifier (ID) of the VM, wherein the data storage device storing the hierarchy of labels is separate from VMs associated with the labels; and
a host controller coupled with the data storage device, the host controller to:
detect, without user interaction, an event that triggers a label reassignment for a VM of a plurality of VMs hosted by one or more servers coupled to the host controller;
identify, in response to detecting the event, one or more labels of the hierarchy of labels that correspond to the event and the VM for the label reassignment, wherein to identify the one or more labels, the host controller further to:
provide a user interface presenting the hierarchy of labels;
receive a selection of a set of labels for the VM from the hierarchy; and
assign, in response to the selection from the user, the set of labels from the hierarchy of labels to the VM;
store, in response to identifying the one or more labels, identifiers of the identified labels with the unique ID of the VM in a VM data store, wherein to store, the host controller is to:
store, in a first database table of the management store, the identifiers of the identified labels from the hierarchy, descriptions of the identified labels, and relationships between the identified labels, wherein the first database table comprises the hierarchy of labels and is a tree having a plurality of nodes representing the labels and a plurality of edges representing relationships between the labels; and
store, in a second database table of the management store, the unique ID of the VM along with the identifiers of the identified labels corresponding to the VM by at least one of modifying previously-assigned labels of the VM or adding new labels to the VM;
group, in response to the label reassignment for the VM and in view of the relationships between the identified labels, the VM with other VMs associated with the identified labels; and
perform, in view of the grouping, a management operation on the VM and the other VMs in response to receiving an end user selection of the identified labels and an identification of the management operation via a graphical user interface (GUI).

7. The system of claim 6, wherein the distinct VM parameter is any one of an organization division characteristic, a geographic location characteristic, and a technical characteristic.

8. The system of claim 6, wherein the host controller is further to:
receive a user request for a list of VMs having one or more specified labels;
search the data store based on the specified labels; and
display the list of VMs having the specified labels.

9. The system of claim 6, wherein the host controller is further to:
receive a user request for a list of labels associated with the VM;
search the database based on the VM; and
display the list of labels associated with the VM.

10. A non-transitory computer readable storage medium including instructions that, when executed by a processor, cause the processor to:
maintain, by the processor executing a host controller, a hierarchy of labels in a management data store, each of the labels of the hierarchy of labels representing a distinct virtual machine (VM) parameter that describes a characteristic of a VM and is separate from a unique identifier (ID) of the VM, wherein the management data store maintaining the hierarchy of labels is separate from VMs associated with the labels;
detect, by the processor, without user interaction, an event that triggers a label reassignment for a VM of a plurality of VMs hosted by one or more servers coupled to the host controller;
identify, by the processor in response to detecting the event, one or more labels of the hierarchy of labels that correspond to the event and the VM for the label reassignment, wherein to identify the one or more labels, the processor further to:
provide a user interface presenting the hierarchy of labels;
receive a selection of a set of labels for the VM from the hierarchy; and
assign, in response to the selection from the user, the set of labels from the hierarchy of labels to the VM;
store, by the processor in response to identifying the one or more labels, identifiers of the identified labels with the unique ID of the VM in a VM data store, wherein to store, the processing device further to:
store, in a first database table of the management store, the identifiers of the identified labels from the hierarchy, descriptions of the identified labels, and relationships between the identified labels, wherein the first database table comprises the hierarchy of labels and is a tree having a plurality of nodes representing the labels and a plurality of edges representing relationships between the labels; and
store, in a second database table of the management store, the unique ID of the VM along with the identifiers of the identified labels corresponding to the VM by at least one of modifying previously-assigned labels of the VM or adding new labels to the VM;
group, by the processor in response to the label reassignment for the VM and in view of the relationships between the identified labels, the VM with other VMs associated with the identified labels; and perform, by the processor in view of the grouping, a management operation on the VM and the other VMs in response to receiving an end user selection of the identified labels and an identification of the management operation via a graphical user interface (GUI).

11. The non-transitory computer readable storage medium of claim 10, wherein the distinct VM parameter is any one of an organization division characteristic, a geographic location characteristic, and a technical characteristic.

12. The non-transitory computer readable storage medium of claim 10, wherein the processor to group the VM with the other VMs further comprises the processor to:
    receive a user request for a list of VMs having one or more specified labels;
    search the VM data store based on the specified labels; and
    display a list of VMs having the specified labels.

13. The non-transitory computer readable storage medium of claim 10, wherein the processor to group the VM with the other VMs further comprises the processor to:
    receive a user request for a list of labels associated with the VM;
    search the VM data store based on the VM; and
    display the list of labels associated with the VM.

* * * * *